July 21, 1964
R. H. WENTORF, JR  3,141,802
SEMICONDUCTING CUBIC BORON NITRIDE
AND METHODS FOR PREPARING THE SAME
Filed May 19, 1961
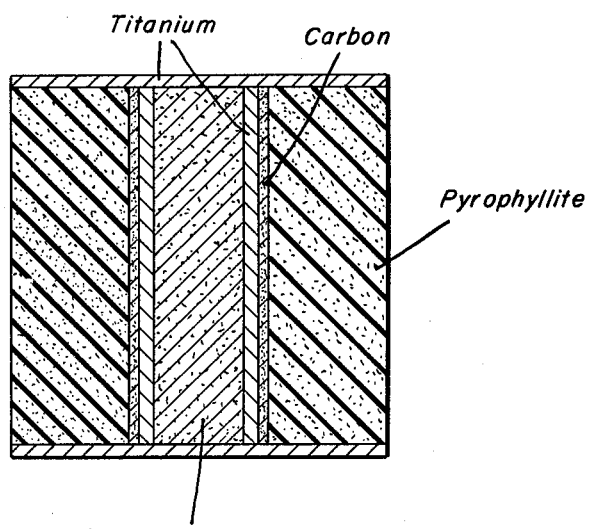
Inventor :
Robert H Wentorf Jr.,
by Joseph T. Cohen
His Attorney.

3,141,802
SEMICONDUCTING CUBIC BORON NITRIDE AND
METHODS FOR PREPARING THE SAME
Robert H. Wentorf, Jr., Schenectady, N.Y., assignor to
General Electric Company, a corporation of New York
Filed May 19, 1961, Ser. No. 111,279
9 Claims. (Cl. 148—171)

This invention is concerned with electrically conducting cubic boron nitride and methods for making the same. More particularly, this invention relates to a cubic boron nitride of an electrically conducting nature, which can be prepared by heating at elevated temperatures and pressures hexagonal boron nitride or a source of hexagonal boron nitride in the presence of either silicon or germanium, or both, employing the usual catalyst for conversion of the starting boron nitride to the cubic boron nitride state.

In my U.S. Patent 2,947,617, issued August 2, 1960, and assigned to the same assignee as the present invention, which by reference is incorporated in the disclosures of the instant application, there is described and claimed an abrasive material comprising cubic boron nitride. This cubic boron nitride, which has an atomic configuration corresponding to the atomic configuration of zinc blende (ZnS), is prepared by converting the common form of boron nitride, for instance, hexagonal boron nitride, to the cubic form under the action of heat and pressure in the presence of at least one catalyst selected from the class consisting of alkali metals, alkaline earth metals, tin, lead, antimony and nitrides of the foregoing metals, the pressures and temperatures being selected so as to be in the range in which the catalyst is operative to catalyze the conversion of ordinary boron nitride to cubic boron nitride. This cubic boron nitride is different from the usual hexagonal boron nitride (which is a relatively soft powdery material and therefore completely useless for abrasive purposes) by having a cubic crystalline configuration analogous to the configuration of zinc blende and having a unit cell edge length of approximately 3.615 angstroms. This cubic boron nitride has a hardness substantially equal to the hardness of diamond and is thermally stable at a temperature even as high as around 2000° C.

In general, the reaction whereby the usual boron nitride is converted to the cubic boron nitride is carried out in the cubic boron nitride stable region at a temperature of at least about 1200° C. and preferably between 1200° C. to 2200° C. at a pressure above about 42,000 atmospheres, for instance, about 45,000 to 110,000 atmospheres or more. A more preferred narrow range of reaction conditions is within a temperature range of from about 1500 to 2100° C. at a pressure of about 50,000 atmospheres to 100,000 atmospheres. More particular directions for carrying out the conversion of the usual boron nitride to the cubic boron nitride form (such as catalyst, nitride source, catalyst source, apparatus, etc.) are found in my aforesaid patent.

When one forms the cubic boron nitride from the usual boron nitride, one finds that the cubic boron nitride is substantially non-conducting electrically, i.e., it has a specific resistance greater than $10^{12}$ ohm-centimeters. Unexpectedly, I have discovered that by incorporating a small amount of an additive selected from the class consisting of silicon and germanium (hereinafter referred to as "additive") with the usual boron nitride and a catalyst for conversion of the latter to the cubic boron nitride form, I am able to obtain an electrically conducting cubic boron nitride whose conductivity varies to a degree with the catalyst used and with the concentration of the additive employed.

Generally, I can use from about 0.001 to as high as 10 percent, by weight, or more of the additive, such as a minor weight amount, based on the weight of the starting boron nitride, namely, the hexagonal boron nitride. Instead of employing silicon or germanium as the additive for obtaining conducting cubic boron nitride, one can also use compounds of silicon or germanium, which under the conditions of the reaction at the elevated temperatures and pressures, are converted to the metallic silicon or germanium state. In any event, it is to be understood that whether one starts with the additives initially or with a compound of the additive decomposable to the metallic state, it is the metallic additive which is causing the electrical conductivity in the cubic boron nitride. For brevity, the term "silicon" or "germanium" is intended to include in the specification and claims, not only silicon and germanium itself, but also compounds of silicon and germanium decomposable to the metallic state. By varying the weight of the additive, I have been able to obtain cubic boron nitride crystals having specific electrical resistances within the range of from $1 \times 10^4$ to $6 \times 10^5$ ohm-centimeters as contrasted to the usual $10^{10}$ to $10^{12}$ ohm-centimeters or higher specific resistance for unmodified cubic boron nitride.

When making semiconducting cubic boron nitride, in addition to the use of the additives which is selected from a class consisting of silicon and germanium, the remainder of the ingredients will comprise those designed to give the usual cubic boron nitride as described in my aforementioned Patent 2,947,617. It is believed that the ultimate reactants involved in the preparation of the cubic boron nitride, other than the above-described additives, are hexagonal boron nitride and the catalyst nitride. Thus, any combination of starting ingredients which will provide both hexagonal boron nitride and a catalyst nitride can be employed in the practice of the present invention. One method of providing this ultimate reactant mixture is to start with a reaction mixture of elemental boron and a catalyst ntiride. Thus, by this procedure when the reactants are brought to reaction pressure and temperature, an equilibrium is established between the reactants so that part of the nitrogen associated with the catalyst becomes associated with the boron so that the reaction mixture at equilibrium contains both the catalyst nitride and boron nitride.

Thus, it is evident that the starting reaction mixture, in addition to the above described additives, must contain a source of boron, a source of nitrogen, and a source of catalyst metal. The source of the boron can be elemental boron, hexagonal boron nitride, or a material such as one of the boron hydrides which will decompose to elemental boron under the conditions of the reaction. The source of nitrogen can be either hexagonal boron nitride or a nitrogen-containing compound of a catalyst metal which will provide a source of nitrogen under reaction conditions. The catalyst metal may be employed as the elemental metal or a catalyst compound which will decompose to the catalyst metal or to the catalyst metal nitride under reaction conditions. Illustrative of a catalyst metal compound is in the reaction of calcium cyanamid with boron to produce cubic boron nitride. It is believed that this reaction involves the preliminary decomposition of the calcium cyanamid to produce calcium nitride and boron nitride which together react to form cubic boron nitride.

It should be understood that the process of the present invention is not limited to the catalytic conversion of hexagonal boron nitride to cubic boron nitride involving only one catalyst material. Thus mixtures of two or more of the catalyst materials can be employed, as can alloys of the metals recited above, such as alloys of more than one catalyst metal and alloys of a catalyst metal and a non-catalyst metal.

In making the cubic boron nitride having the electrically conducting properties, it is only essential that one form a homogeneous mixture of the source of boron, e.g., hexagonal boron nitride, the specific catalyst employed, and the additive, all preferably in the finely divided state, and thereafter effect the pressing at elevated temperatures and pressures to obtain the electrically conducting cubic boron nitride. Alternatively, one can start with cubic boron nitride, mix it with the additive and catalyst, and at elevated temperatures and pressures at which the cubic boron nitride is formed, the latter is reconstituted to form cubic boron nitride having the desired electrical conductivity. An apparatus suitable for carrying out the high temperature, high pressure reaction required to form the electrically conducting cubic boron nitride is found described in the patent of H. Tracy Hall, U.S. 2,941,248, issued June 21, 1960, and assigned to the same assignee as the present invention. As pointed out in my above patent, the catalyst used in making the conducting cubic boron nitride may be employed in the form of coarse or fine powders, or as a tube within which the hexagonal boron nitride and the additive are introduced, the tube itself acting as a catalyst for the conversion of the hexagonal boron nitride to the cubic boron nitride. Titanium, tantalum or carbon tubes may also be used to contain the ingredients.

I have found that certain advantages are to be derived in using certain types of assemblies for effecting conversion of the hexagonal boron nitride (or other source of the non-cubic form of boron nitride) to the cubic boron nitride state. In particular, I have found that the mixture of the hexagonal boron nitride, additive, and catalyst for conversion of the boron nitride to the cubic form is advantageously introduced into a titanium or tantalum tube, preferably a titanium tube because of the economic considerations involved, prior to placing the mixture of ingredients in the press more particularly described in the above Hall patent and in my aforesaid Patent 2,947,617. Under the conditions of the reaction, the titanium or tantalum is converted to the nitride or boride forms, for instance, titanium nitride and/or titanium boride (as well as the tantalum nitride and/or tantalum boride) which take on a refractory hard state preventing leakage of the contents of the tube. In the absence of such an assembly, whereby the reaction ingredients are merely placed in a tube comprising the compressible gasket, for instance, a tube of pyrophyllite, there are losses encountered resulting in reduced yields of the conducting cubic boron nitride due to leakage. When employing the titanium tube, it is also desirable that the titanium tube be encased in a conducting yet protective casing, for instance, a tube of carbon, to prevent undue oxidation, i.e., deterioration, of the titanium tube which would obviously defeat the purpose in using the titanium tube or vessel.

The amount of catalyst used may vary widely. Preferably, one employs from about 0.1 to 1 part of catalyst per part of the hexagonal boron nitride, although it is obvious that one can employ larger or smaller amounts of the catalyst per part of boron nitride without departing from the scope of the invention. The larger amounts of catalyst will reduce the amount of cubic boron nitride formed, and ordinarily this excessive amount of catalyst is not essential. Generally, it is only necessary to place the mixture of the additive, catalyst, and hexagonal boron nitride in the press in a suitable reaction vessel such as a tantalum or graphite tube or even a tube made from the catalyst metal (in which case no additional catalyst is needed) and subject the assembly to a pressure within the range described above for about 5 to 30 minutes to form the electrically conducting cubic boron nitride.

In order that those skilled in the art may better understand how the present invention may be practiced, the following examples are given by way of illustration and not by way of limitation. All parts are by weight.

The pressure conditions were determined in the manner described in my aforesaid U.S. Patent 2,947,617 using as standards the electrical resistance transition pressures of 60,000 atmospheres for the barium transition [formerly believed by P. W. Bridgman as shown in "Proceedings of the American Academy of Arts and Sciences," 81, pp. 165–251 (1952), to occur at 77,400 atmospheres] and 24,800 atmospheres for the bismuth I to II transition.

In these examples, the high pressure, high temperature apparatus used was that described in the aforesaid Hall patent. In general, the manner of carrying out the high pressure and high temeprature reactions was as follows. When using silicon as the additive, a charge of 1.7 parts hexagonal boron nitride, 0.425 part $Li_3N$ catalyst, and silicon in the amount specified below, all in the finely divided state, was placed in a titanium tube open at both ends and whose dimensions were 0.93 inch long and having an outside diameter of 0.375 inch and an inside diameter of 0.357 inch. The titanium tube was encased by a close fitting spectroscopic arc (high purity) carbon tube 0.93 inch long and having an outside diameter of 0.44 inch and this assembly in turn was placed in another snugly fitting tube comprising the compressible ceramic, specifically pyrophyllite, described in my aforementioned patent, also 0.93 inch long and having an outside diameter of 0.75 inch.

End caps or disc closures of titanium metal (about 0.02 inch thick) were placed at each end of the titanium tube so that the end caps covered the end surfaces of the titanium tube, the carbon tube, and the pyrophyllite tube, as is more particularly described in the attached drawing in which the single cross-sectional figure shows the relationship of the three nesting tubes. After carrying out the high temperature, high pressure reaction, under the conditions recited in the following Example 1, the cubic boron nitride was separated by dissolving the matrix in which cubic boron nitride was formed, in hydrochloric acid or aqua regia. This resulted in most cases in a mixture of cubic boron nitride with some unreacted hexagonal boron nitride. The cubic boron nitride was separated from the hexagonal material by hand, or by using a filtration technique in which the mixture was added to bromoform in which the hexagonal boron nitride would float and in which the cubic boron nitride sinks. In all these tests, resistance heating was employed for bringing the reactants to the desired temperature. The formation of cubic boron nitride was established by X-ray crystallography, refractive index, density, chemical analysis, and hardness tests. The conductivity (or specific resistance) was established by the probe technique which is a well known means for determining conductivity. The semiconducting properties were established by thermoelectric power measurements.

EXAMPLE 1

In this example, amounts of lithium nitride, hexagonal boron nitride, and silicon were mixed together employing the proportions of lithium nitride and hexagonal boron nitride recited above. The amount of silicon added in each instance is described in the following table. The mixture of ingredients was then placed in each instance in the concentric cylinders described above, the end caps of titanium placed across each end of the assembly as shown in the accompanying drawing, and the total assembly pressed for varying lengths of time at slightly varying temperatures and at a pressure of about 58,000 atmospheres. Thereafter, the cubic boron nitride formed was isolated, and identified by its crystalline cubic habit, a refractive index, and hardness as being cubic boron nitride, and conformed in every respect to the crystal structure of the cubic boron nitride recited in my aforesaid patent. However, in contrast to the usual cubic boron nitride of low conductivity, the cubic boron nitride prepared as a result of carrying out the process in the present example was quite conducting and had a specific resistance within the range of $2 \times 10^3$ to $6 \times 10^5$ ohm-centimeters. The following Table I shows the amount of silicon used in each charge, the temperature, the time for which the pressures and temperatures were applied, and the resistivity in ohm-centimeters of the conducting products obtained.

Table I

| Sample No. | Grams Si in Charge | Maxim. Temp. °C. | Time, Minutes | Specific Resistivity,[1] ohm-cm. |
|---|---|---|---|---|
| A | 0.1 | 2,100 | 20 | $1.25 \times 10^4$ to $5 \times 10^5$. |
| B | 0.05 | 2,050 | 20 | $4 \times 10^4$ to $6 \times 10^5$. |
| C | 0.05 | 2,250 | 30 | $2 \times 10^3$ to $2.5 \times 10^5$. |
| D | 0.05 | 2,150 | 27 | $1.5 \times 10^4$ to $2 \times 10^5$. |

[1] All crystals had a maximum size of around $300\mu$.

As a result of thermoelectric power measurements, all of the above-described conducting cubic boron nitride crystals were found to exhibit n-type semi-conducting properties when measured, for example, in the manner described in "Introduction to Semi-Conductors," by W. Crawford Dunlap, published by John Wiley & Sons, Inc., New York, N.Y. (1957).

It is also possible by means of my invention to prepare semiconducting cubic boron nitride having at least one p-n junction. Thus, one can heat at elevated temperatures and pressures conducive to forming cubic boron nitride, a mixture of ingredients which in the reaction vessel is in contact with a p-type semiconducting cubic boron nitride (prepared in accordance with my patent application Serial No. 2,978, filed January 18, 1960, and assigned to the same assignee as the present invention, now Patent No. 3,078,232), the said mixture of ingredients comprising those recited previously designed to give the n-type semiconducting cubic boron nitride such as, for instance, hexagonal boron nitride, lithium nitride and either or both silicon and germanium as the additives. Examples 2 and 3 below illustrate the preparation of a cubic boron nitride having a p-n junction in its structure.

EXAMPLE 2

In this example, p-type semiconducting cubic boron nitride crystals were prepared by heating a mixture on a weight basis of one part beryllium, 40 parts lithium nitride, and 150 parts hexagonal boron nitride, all in powder form, in the reaction vessel described previously for a period of about 15 minutes at about 58,000 atmospheres and at a temperature of about 2000° C. At the end of this time the cubic boron nitride thus formed was isolated in the usual manner and was found to have a specific resistance within the range of $1 \times 10^6$ to $5 \times 10^6$ ohm-centimeters. This conducting boron nitride exhibited p-type semiconducting properties. The preparation of semiconducting crystals of cubic boron nitride employing beryllium as the doping agent is more specifically described in my co-pending application Serial No. 2,978, now Patent No. 3,078,232.

EXAMPLE 3

In this example, cubic boron nitride crystals of the p-type prepared in accordance with Example 2 were mixed with 1.7 grams hexagonal boron nitride, 0.425 gram lithium nitride, 0.05 gram silicon. The mixture of the above ingredients and the p-type semiconducting cubic boron nitride crystals was then heated at a pressure of about 54,000 atmospheres at a temperature of about 2000° C. for 20 minutes. At the end of this time, upon testing the formed crystals, it was found that they possessed rectifying properties of being able to pass current in both directions. In one instance, one of the newly formed crystals could pass current twice as easily in one direction as in the other with a 6 volt input at room temperature of about 23° C. The resistance of these rectifying cubic boron nitride crystals, which contained a p-n junction, was in the range of $6 \times 10^4$ to $1.2 \times 10^5$ ohm-centimeters.

EXAMPLE 4

Employing the same reaction vessel and press equipment described previously for Examples 1 to 3, a charge of two parts hexagonal boron nitride, 0.5 part lithium nitride and about 0.15 part germanium, all in the finely divided state, was heated at a temperature of about 1600 to 2000° C. at a pressure of about 55,000 atmospheres for about 10 to 12 minutes. The resulting cubic boron nitride crystals were separated as was done in the previous examples, and thereafter tested and found to be n-type semiconductors by the usual thermoelectric power tests. These crystals which varied from 0.1 to 0.25 mm. in average diameter had resistivities within the range of from about $7 \times 10^3$ to $1 \times 10^6$ ohm-centimeters when measured at room temperature.

It will, of course, be understood by those skilled in the art that in addition to using the lithium nitride catalyst shown above, other catalysts, e.g., tin and magnesium nitride, may be employed, many examples of which have been recited above, without departing from the scope of the invention. The conditions may be varied as well as the concentration of the silicon and germanium, and of the catalyst materials, without affecting the scope of the invention herein defined and claimed.

Electrically conducting cubic boron nitride herein prepared has many uses. Primarily because of the fact that it has an n-type conductivity, the electrically conducting cubic boron nitride is useful as semiconductors and semiconducting devices such as transistors, rectifiers, thermometers, etc. Additionally, the conducting cubic boron nitride can also be used as electroluminescent bodies for light sources or as high energy particle counters. The fact that the cubic boron nitride is electrically active recommends its use as a high temperature catalyst for oxidation or recombination reactions.

A still further use for these electrically conducting cubic boron nitride compositions is in connection with computer memory systems. Thus a "memory" phenomenon was observed when two cubic boron nitride crystals, one of the n-type and another of the p-type, were connected in series and small currents were passed through the crystals. It was found that the initial current in one direction depended upon the direction of the previous current through crystal. Thus, it was found that if in the first passage of the current through the crystal pair was in one direction, then when the applied E.M.F. was reversed, so that the current flowed in an opposite direction, the initial value of current in the second direction was about twice as large as the steady state value of current reached shortly thereafter. On the other hand, if the second passage of current was in the first direction, then the second and subsequent passages of current in this direction would be as expected for an ohmic circuit, i.e., current proportional to impressed voltage at all times. Computing machines could take advantage of such a property, particularly because of the advantages inherent in the small size of the semiconducting crystals and because of the small currents and voltages required to produce the memory effect.

What I claim as new and desire to secure by Letters Patent of the United States is:

1. The process for making electrically conducting cubic boron nitride having a specific electrical resistance of below $10^{10}$ ohm-centimeters which comprises heating at elevated temperatures of at least 1200° C. and pressures of at least 42,000 atmospheres a mixture of ingredients comprising (1) at least one catalyst metal selected from the class consisting of alkali metals, alkaline earth metals, lead, antimony, tin and nitrides of the foregoing metals, (2) a source of boron selected from the class consisting of elemental boron, hexagonal boron nitride and compounds of boron decomposable to elemental boron at the above elevated temperatures and pressures, (3) a source of nitrogen selected from the class consisting of hexagonal boron nitride and nitrogen-containing compounds of the aforesaid catalyst materials which provide a source of nitrogen under the temperatures and pressures used for effecting formation of the cubic crystal structure boron nitride, and (4) a positive amount up to 10 percent, by weight, based on the total weight of (2) and (3) of an additive selected from the class consisting of silicon and germanium, the catalytic pressure and temperature conditions being those required to form the electrically conducting cubic boron nitride.

2. The process for making electrically conducting cubic boron nitride having a specific electrical resistance of below $10^{10}$ ohm-centimeters which comprises heating at a temperature of at least 1200° C. and at a pressure of at least 42,000 atmospheres hexagonal boron nitride in the presence of a positive amount up to 10 percent, by weight, based on the weight of the hexagonal boron nitride of an additive selected from the class consisting of silicon and germanium under catalytic pressure and temperature conditions conducive to the conversion of the hexagonal boron nitride to cubic boron nitride, the said heating being conducted in the presence of a catalyst selected from the class consisting of alkaline metals, alkaline earth metals, lead, antimony, tin and nitrides of the foregoing metals.

3. The process for making electrically conducting cubic boron nitride having a specific electrical resistance of below $10^{10}$ ohm-centimeters which comprises heating hexagonal boron nitride at a pressure in excess of 42,000 atmospheres and at a temperature of at least 1200° C. in the presence of a catalyst selected from the class consisting of alkali metals, alkali earth metals, lead, antimony, tin and nitrides of the foregoing metals, employing in addition to said catalytic materials, a positive amount up to 10 weight percent of silicon, based on the weight of the boron nitride.

4. The process for making an electrically conducting cubic boron nitride having a specific electrical resistance of below $10^{10}$ ohm-centimeters and having n-type semiconductor characteristics which comprises introducing a mixture comprising hexagonal boron nitride, a positive amount up to 10 weight percent silicon, based on the weight of the hexagonal boron nitride, and a catalyst for the conversion of the hexagonal boron nitride to cubic boron nitride selected from the class consisting of alkali metals, alkaline earth metals, lead, antimony, tin and nitrides of the foregoing metals, into a titanium tube and thereafter subjecting the titanium tube and its contents to a pressure of at least 42,000 atmospheres and a temperature of at least 1200° C.

5. The process for making electrically conducting cubic boron nitride having a specific electrical resistance of below $10^{10}$ ohm-centimeters which comprises heating hexagonal boron nitride at a pressure in excess of 42,000 atmospheres and at a temperature of at least 1200° C. in the presence of a catalyst selected from the class consisting of alkali metals, alkali earth metals, lead, antimony, tin and nitrides of the foregoing metals, employing in addition to said catalytic materials, a positive amount up to 10 weight percent of germanium, based on the weight of the boron nitride.

6. The process for making electrically conducting cubic boron nitride having a specific electrical resistance of below $10^{10}$ ohm-centimeters and having at least one p-n junction which comprises heating at elevated temperatures of at least 1200° C. and pressures of at least 42,000 atmospheres a mixture of ingredients comprising (1) at least one catalyst metal selected from the class consisting of alkali metals, alkaline earth metals, lead, antimony, tin and nitrides of the foregoing metals, (2) a source of boron selected from the class consisting of elemental boron, hexagonal boron nitride and compounds of boron decomposable to elemental boron at the above elevated temperatures and pressures, (3) a source of nitrogen selected from the class consisting of hexagonal boron nitride and nitrogen-containing compounds of the aforesaid catalyst materials which provide a source of nitrogen under the temperatures and pressures used for effecting formation of the cubic crystal structure boron nitride, (4) a positive amount up to 10 weight percent based on the total weight of (2) and (3) of an additive selected from the class consisting of silicon and germanium, and (5) a p-type semiconducting cubic boron nitride, the catalytic pressure and temperature conditions being those required to form the electrically conducting cubic boron nitride.

7. The process for making a semiconducting crystalline cubic boron nitride having a specific resistance of below $10^{10}$ ohm-centimeters and having at least one p-n junction which comprises heating at elevated temperatures of at least 1200° C. and at a pressure in excess of 42,000 atmospheres a mixture of ingredients comprising (1) a p-type semiconducting cubic boron nitride, (2) hexagonal boron nitride, (3) a catalyst selected from a class consisting of alkali metals, alkaline earth metals, lead, antimony, tin and nitrides of said metals, and (4) a positive amount up to 10 weight percent based on the weight of the hexagonal boron nitride of an additive selected from the class consisting of silicon and germanium.

8. N-type semiconducting crystalline cubic boron nitride having incorporated therein a sufficient amount of an additive selected from the class consisting of silicon and germanium to impart to the cubic boron nitride a specific electrical resistance below $10^{10}$ ohm-centimeters.

9. Semiconducting crystalline cubic boron nitride containing at least one p-n junction having incorporated therein a sufficient amount of an additive selected from the class consisting of silicon and germanium to impart to the cubic boron nitride a specific electrical resistance below $10^{10}$ ohm-centimeters.

References Cited in the file of this patent

UNITED STATES PATENTS

| 2,762,730 | Alexander | Sept. 11, 1956 |
| 2,858,275 | Folberth | Oct. 28, 1958 |
| 2,947,617 | Wentorf | Aug. 2, 1960 |

OTHER REFERENCES

"Properties of Elemental and Compound Semiconductors," Metallurgical Society Conferences, Interscience Publishers, New York, January 1960, p. 49.